United States Patent [19]

Mockovciak, Jr.

[11] Patent Number: 4,543,761
[45] Date of Patent: Oct. 1, 1985

[54] JOINING TECHNIQUES FOR LARGE STRUCTURES

[75] Inventor: John Mockovciak, Jr., Dix Hills, N.Y.

[73] Assignee: Grumman Aerospace Corporation, Bethpage, N.Y.

[21] Appl. No.: 389,182

[22] Filed: Jun. 16, 1982

[51] Int. Cl.⁴ .............................................. E04H 12/10
[52] U.S. Cl. ........................................ 52/655; 52/637; 52/646
[58] Field of Search ................. 52/655, 648, 633, 638, 52/646, 637, DIG. 10; 403/74, 75, 122, 114, 115

[56] References Cited

U.S. PATENT DOCUMENTS

| | | |
|---|---|---|
| 1,678,431 | 7/1928 | Goodrich . |
| 1,837,374 | 12/1931 | Samuel . |
| 2,043,498 | 6/1936 | Uecker .................................. 364/2 |
| 2,092,022 | 9/1937 | Rieger . |
| 2,237,965 | 4/1941 | Kendrick . |
| 2,293,489 | 8/1942 | Causey . |
| 2,631,900 | 3/1953 | Simpson ................................ 304/2 |
| 2,936,862 | 5/1960 | Cvikl . |
| 2,959,256 | 11/1960 | Deam . |
| 3,007,232 | 11/1961 | Thiry ..................................... 29/155 |
| 3,049,196 | 8/1962 | Attwood . |
| 3,094,847 | 6/1963 | Pogonowski ..................... 52/637 X |
| 3,103,262 | 9/1963 | Handley . |
| 3,111,207 | 11/1963 | Braddon . |
| 3,241,142 | 3/1966 | Raabe ................................... 343/100 |
| 3,247,634 | 4/1966 | Attwood ............................... 52/222 |
| 3,354,591 | 11/1967 | Fuller .................................... 52/81 |
| 3,449,872 | 6/1969 | Craighead et al. ...................... 52/66 |
| 3,685,221 | 8/1972 | Mangan ................................ 52/80 |
| 3,731,450 | 5/1973 | DuChateau ........................... 52/648 |
| 3,785,109 | 1/1974 | Letourneur .......................... 52/633 |
| 3,913,285 | 10/1975 | Helfrich .......................... 52/637 X |
| 4,057,207 | 11/1977 | Hogan .................................. 244/159 |
| 4,100,708 | 7/1978 | Bobrovnikov et al. ............... 52/222 |
| 4,189,892 | 2/1980 | Smith ............................... 52/637 X |
| 4,308,699 | 1/1982 | Slysh .................................... 52/108 |
| 4,332,501 | 6/1982 | Slysh ................................... 403/219 |
| 4,334,816 | 6/1982 | Slysh ..................................... 414/10 |
| 4,337,560 | 7/1982 | Slysh .................................... 29/155 |
| 4,400,926 | 8/1983 | Tuggle .................................. 52/646 |

FOREIGN PATENT DOCUMENTS 1459963 10/1969 Fed. Rep. of Germany .

OTHER PUBLICATIONS

Browning, L., et al.; Space Construction Automated Fabrication Experiment Definition Study (SCAFEDS) Part II Final Briefing; Report No. CASD-ASP77-016; General Dynamics Convair Div.; San Diego, Ca.; Feb. 3, 1978.

Browning, L., et al.; Space Construction Automated Fabrication Experiment Definition Study (SCAFEDS) Final Report vol. III–Requirements; Report No. CASD-ASP77-018; Gen. Dynamics Convair Div.; San Diego, Ca.; May 5, 1978.

Browning, L., et al.; Space Construction Automated Fabrication Experiment Definition Study (SCAFEDS) Final Report vol. I–Executive Summary; Report No. CASD-ASP77-017; Gen. Dynamics Convair Div.; San Diego, Ca.; May 12, 1978.

Browning, L., et al.; Space Construction Automated Fabrication Experiment Definition Study (SCAFEDS) Final Report–vol. II–Study Results; Report No. CASD-ASP77-017; Gen. Dynamics Convair Div.; San Diego, Ca.; May 26, 1978.

(List continued on next page.)

Primary Examiner—J. Karl Bell
Attorney, Agent, or Firm—Richard G. Geib

[57] ABSTRACT

A construction technique is disclosed for facilitating the rapid assembly of large structures at remote sites, both terrestrial and extra terrestrial, comprising joining modular sub-assemblies embodied as triangular trusses in a limited number of standardized interconnecting modes to form final structures, the construction technique utilizing modular interconnecting members for facilitating the rapid joinder of the sub-assemblies in one or more of these modes.

33 Claims, 29 Drawing Figures

OTHER PUBLICATIONS

Browning, L., et al.; Space Construction Automated Fabrication Experiment Definition Study (SCAFEDS) Part III Final Briefing; Report No. CASD-ASP78-014; Gen. Dynamics Convair Div.; San Diego, Ca,; Apr. 24, 1979.

Browning, L., et al.; Space Construction Automated Fabrication Experiment Definition Study (SCAFEDS) Final Report vol. III-Requirements; Report No. CASD-ASP78-016; Gen. Dynamics Convair Div.; San Diego, Ca.; Jun. 29, 1979.

Mockovciak, Jr.; Systems Definition Study for Shuttle Demonstration Flights of Large Space Structures, vol. 2, Tech. Report No. DRD-MA-04; Grumman Aerospace Corp.; Bethpage, New York; Jul. 1979.

Ball-and-Socket Joint can be Disassembled; Tech Brief LAR-12770; Nat'l. Aeronautics & Space Administration, Langley Research Center; Hampton, Va.; Spring 1981.

Terminology, Symbols & Units for Large Space Structures; Standard No. AAS-0001-81; Amer. Institute of Aeronautics & Astronautics, New York, N.Y.; Jul. 17, 1981.

Browning, D. L.; AIAA Tech. Information Report Large Space Structures; Draft Report for NASA/AIAA Standards Assessment Contract No. NAS-W-3355; Amer. Institute of Aeronautics & Astronautics, New York, N.Y.; Jun. 30, 1981.

Britton, W. R., Spencer, R. A., Thulson, M. D.; Structural Attachments for Large Space Structures (Development of Attachment Concepts); Report No. MCR-78-596; Martin Marietta Corp.; Denver, Co.; Jul. 1978.

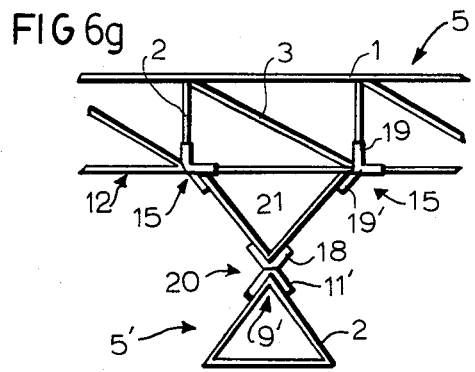
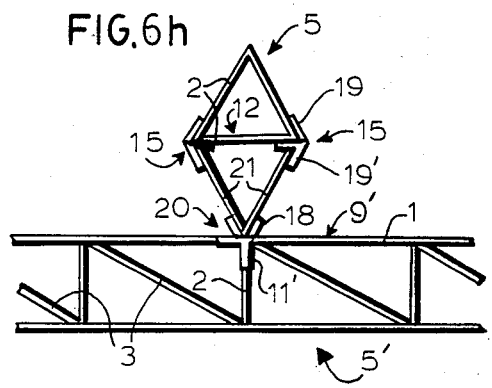
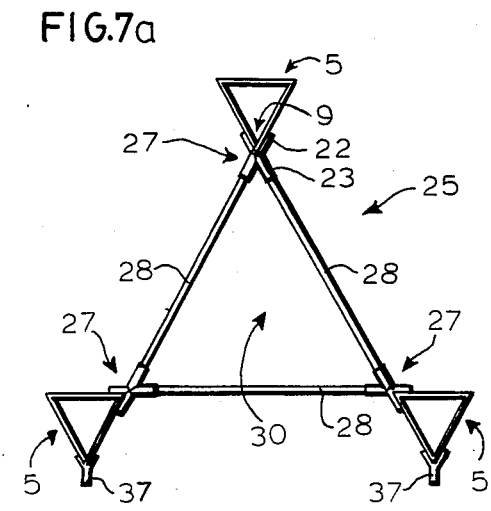
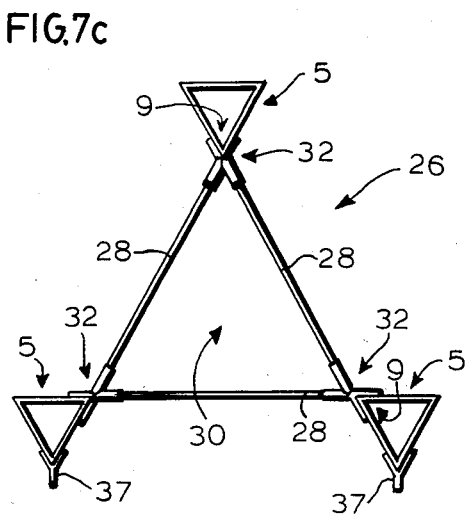

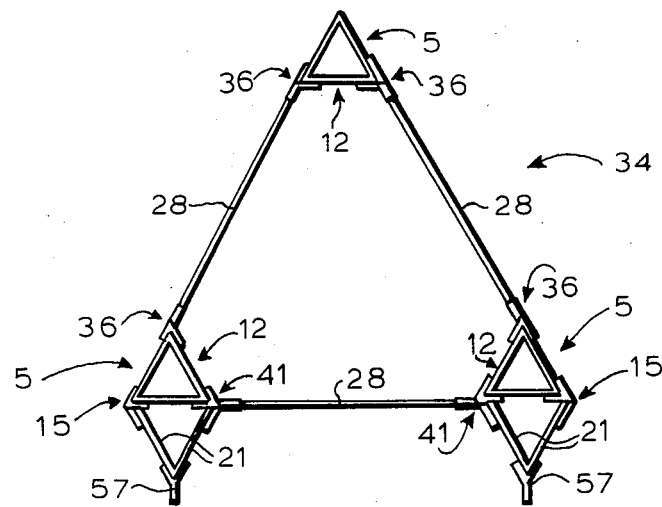
FIG.8c
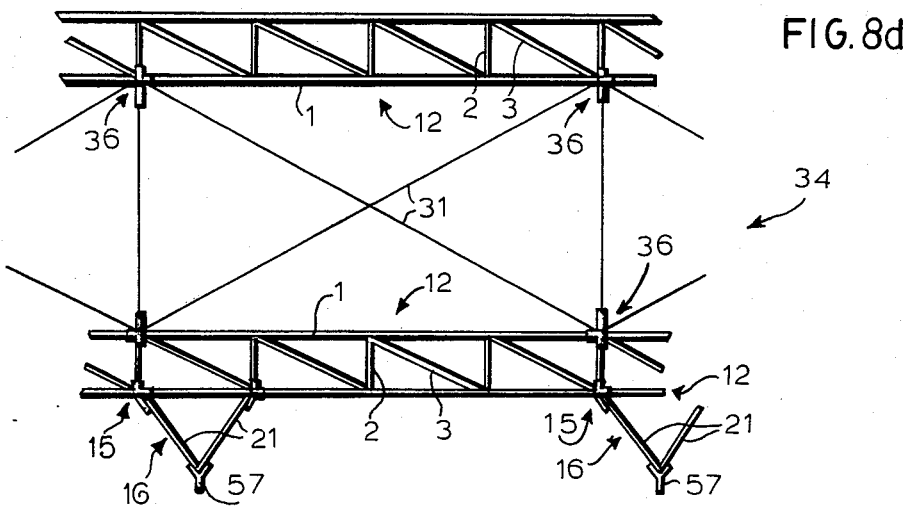
FIG.8d
FIG.9a
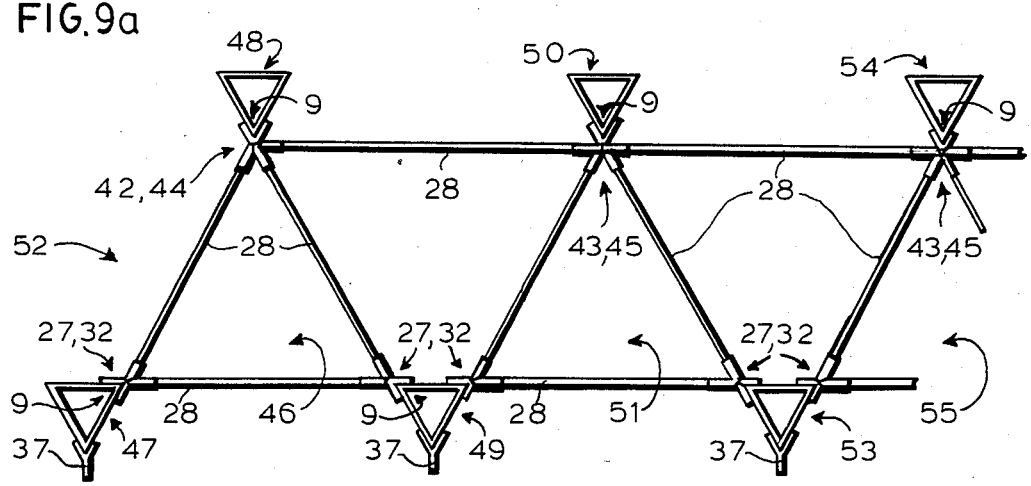

JOINING TECHNIQUES FOR LARGE STRUCTURES

BACKGROUND OF THE INVENTION

The invention relates to a construction technique for facilitating the rapid assembly of large structures at any site, both terrestrial and extra terrestrial.

There is often a need or a desire to build large structures in locations which are extremely remote, or at least difficult to reach from established areas of civilization. This need or desire has become more intense in recent times as man seeks to explore and exploit areas never before inhabited or developed by him. Such areas might include the arctic or desert regions of the world, or even the vast open expanses of outer space. A typical example of such large structures would be any one of the facilities used to house the machinery and laborers required to carry out manufacturing operations in remote areas, e.g., a manufacturing facility used to remove oil and gas resources located in a relatively remote area such as the wilderness of Alaska.

A more exotic example might be one of the extra-terrestrial structures planned for future specific applications in outer space or for the general exploitation of the resources located there. The ideas for such structures are not new since the design concepts for them have been developed over the last decade, prompted by studies sponsored by the National Aeronautics Space Administration (NASA).

In addition to such regularly planned remote construction projects, there may often be a need to quickly provide large structures in remote areas on short notice in response to emergencies.

For example, there may be a need to provide temporary barracks structures for housing soldiers stationed in remote areas for extended periods of time in response to an emergency situation; or there may be a need to provide emergency shelters in disaster areas on short notice to accommodate large numbers of victims of storms, floods or like catastrophes, or even refugees.

Attending the construction of any of these large structures in such remote areas, in addition to the normal problems associated with any large construction project, are the economic constraints associated with transporting building materials, machinery and labor to such areas, and with supporting extended on-site construction activity in such areas.

Such economic constraints become particularly acute when the selected construction site is in outer space where a major portion of the cost of any project is associated with putting the material in orbit and with supporting extended construction activity there. If such constraints are deemed to be too prohibitive, certain proposed structures may never be built, or delayed indefinitely because of the prohibitive cost of their construction.

SUMMARY OF THE INVENTION

Accordingly, it is a principal object of the present invention to provide a universally adaptable construction technique for facilitating the assembly of large structures at any site, irrespective of its location. Another object of the present invention is to provide a construction technique which utilizes on-site fabricated sub-assemblies and modular interconnecting members to facilitate the construction of large structures. Another object of the present invention is to provide a construction technique which will allow a reduction in the time and thereby the cost of constructing large structures without compromising their structural integrity. A further object of the present invention is to provide a modular construction technique which, while utilizing substantially uniform sub-assemblies and interconnecting members, simultaneously permits the rapid construction of large structures having a broad range of sizes and designs.

According to the present invention, all the structural components used to construct a large structure employ a modular configuration. This permits the sub-assemblies to be easily joined together in a limited number of interconnecting modes by a corresponding limited number of modular interconnecting members which connect quickly, and which correspond in their design and manufacture to the interconnecting modes being used. This modular approach results in a cost savings in building such structures since the limited number of parts which must be manufactured reduces tooling, manufacturing and inventory costs.

In addition, the standardization of all the structural components facilitates the use of on-site automated equipment to fabricate structural sub-assemblies ready for interconnection into final structures, thereby resulting in additional construction cost savings. The modular approach allows the final on-site assembly of a large structure to be done quickly, not unlike a tinker-toy that is rapidly assembled from basic building blocks. The result is a simpler, more efficient means of constructing large structures, requiring less labor and construction equipment, resulting in substantial cost savings in the areas of manufacture and final assembly.

The invention is also based on the recognition that modular sub-assemblies embodying certain forms are especially well suited to the construction of a wide variety of structural designs. Illustrative of these forms are pentahedral truss beams of varying lengths, which are known in the art and which are referred to as triangular trusses. In the present invention these triangular trusses are the modular sub-assemblies which are interconnected by the modular interconnecting members to construct various large structures encompassing various designs. The modular interconnecting members used with the trusses vary according to the interconnecting modes used to implement the design of the final structure. Generally, however, these modular interconnecting members include connecting joints, quadrapod structures and vertical and diagonal structural members, while the interconnecting modes include cross (or lap) arrangements, tribeams and platforms.

In the cross arrangement the trusses in orthogonal relationship are joined along their longitudinal sides by one or more modular interconnecting members which comprise connecting joints, and in some arrangements, quadrapod structures. In accordance with the cross type arrangement the trusses are interconnected either apex-to-apex, base-to-base or base-to-apex.

In the tribeam arrangement three parallel triangular truss beams, spaced equidistant from each other, are interconnected by a plurality of modular interconnecting members comprising connecting joints and vertical and diagonal structural members to form larger beams called Tribeams. The Tribeams, in turn, can be used in cross arrangements like the triangular truss beams.

In the platform arrangement a multiplicity of Tribeams and triangular trusses are interconnected by a plurality of modular interconnecting members comprising connecting joints and vertical and diagonal structural members to form still larger structures utilizing the multiplicity of repetitive tribeam patterns in overlapping fashion.

Basic triangular trusses can be readily fabricated at any construction site by an automated beam builder which is easily transported to any site, and which is known in the art, the operation of such beam builder being described in greater detail hereinafter. The use of such a beam builder, modified to fabricate triangular trusses with the connecting joints described herein attached thereto, allows the rapid assembly at any construction site of any of the previously described large structures having a fairly open structural design. Other structures which may use the construction technique described herein might include radio or microwave transmission towers located at intermediate points over long distances; large greenhouses used for special planting projects, especially in remote areas such as a desert; or large animal shelters or barns and any fencing which may also be used on a farm or ranch. In the latter case the depth of the triangular truss would be reduced substantially over the normal size used in building structures. Of course, any structure which lends itself to the use of an open structural design would also be capable of using the construction technique of the present invention.

DESCRIPTION OF THE DRAWINGS

FIGS. 6g and 6h are diagrammatic front and side elevation views respectively of two triangular trusses interconnected by a plurality of connecting joints and a single quadrapod structure in a base-to-apex cross arrangement.

FIGS. 7a and 7b are diagrammatic front and side elevation views respectively of an Inverted-Apex Tribeam in which the modular sub-assemblies are interconnected by a plurality of connecting joints and structural members, the diagonal structural members used for diagonal bracing comprising structural braces.

FIGS. 7c and 7d are diagrammatic front and side elevation views respectively of an Inverted-Apex Tribeam in which the modular sub-assemblies are interconnected by a plurality of connecting joints and pairs of pre-tensioned cables, the diagonal structural members used for diagonal bracing comprising pairs of pre-tensioned cables.

FIGS. 8c and 8d are diagrammatic front and side elevation views respectively of an Upright-Apex Tribeam in which the modular sub-assemblies are interconnected by a plurality of connecting joints and pairs of pre-tensioned cables, the diagonal structural members used for diagonal bracing comprising pairs of pre-tensioned cables.

FIG. 9a is a diagrammatic front elevation view of a large structural platform using an inverted-apex design (similar to FIG. 7a) in which the modular sub-assemblies are interconnected by a plurality of connecting joints and structural members.

FIG. 10b is a close-up view of one of the connecting joints shown in the Tribeam at FIGS. 7a, 7B and 10a.

DESCRIPTION OF THE INVENTION

Figure 1:
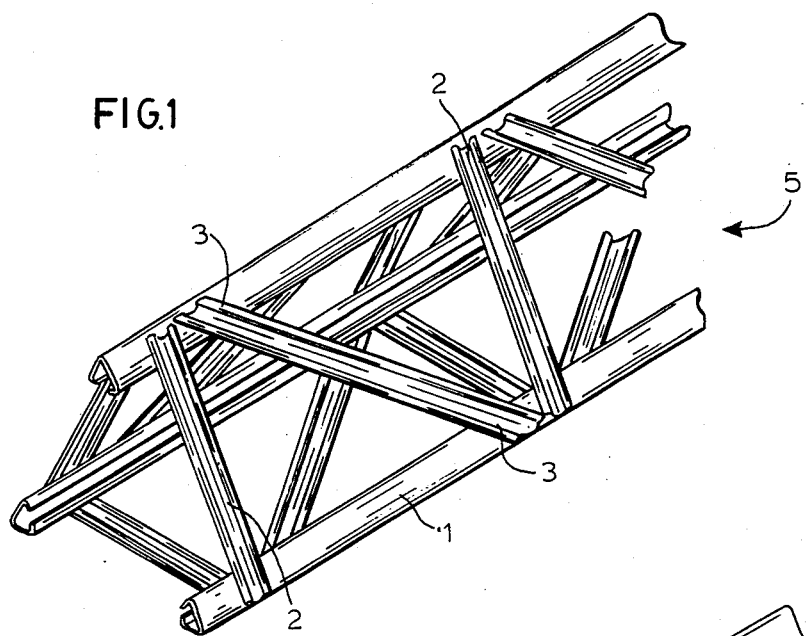
FIG. 1 is a perspective view of the basic structural sub-assembly embodied as a triangular truss using brace members for diagonal bracing.
Figure 2:
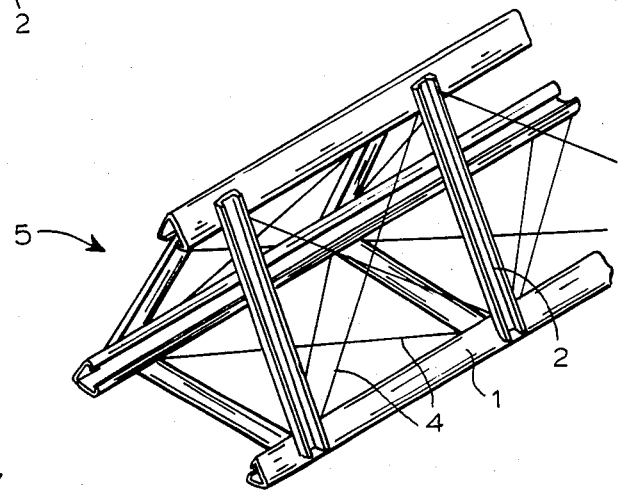
FIG. 2 is a perspective view of the basic structural sub-assembly embodied as a triangular truss using pairs of pre-tensioned cables for diagonal bracing.

Shown in FIGS. 1 and 2 are two representative versions of the basic structural member, the triangular truss beam, used for the construction of large structures. Truss 5 shown in FIG. 1 consists of three parallel cap members, or longerons 1, arranged to form a continuous longitudinal structure with a generally triangular cross section. The longerons 1 are each of hollow triangular cross-section with one leg only partially closed. They are tied together by a series of v-shaped interconnecting vertical brace members, or battens 2, lying in a plane normal to the longitudinal axis of truss 5, and a series of interconnecting diagonal brace members, or braces 3, also v-shaped, lying diagonally between adjacent battens 2. The battens 2 provide lateral stability to the member longerons 1, and when taken in conjunction with the diagonal braces 3 they provide the desired truss characteristics.

Truss 5, shown in FIG. 2, is essentially of the same construction as Truss 5 of FIG. 1, except that it is constructed with an alternative means of diagonal bracing consisting of pairs of diagonal pretensioned cables 4 interconnected between adjacent u-shaped battens 2.

The longerons 1, battens 2 and braces 3 of truss 5 may be fabricated from thin gauge aluminum or composite materials, or combinations of these. Composite materials which may be used include graphite-polyethersulfone, graphite-polysulfone or graphite-acrylic.

Figure 3:
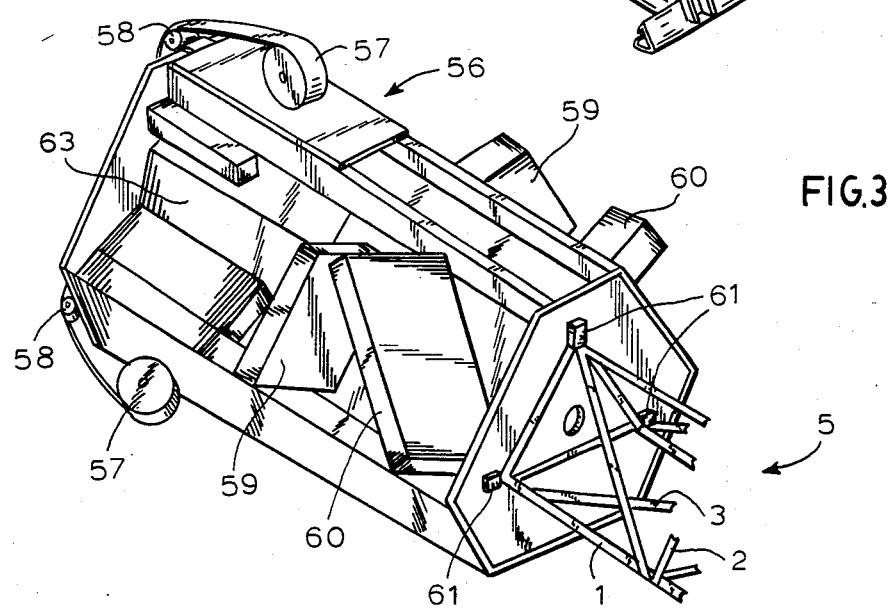
FIG. 3 is a perspective view of a simplified version of an automated beam builder used to fabricate the basic triangular truss beam.

As shown in FIG. 3 by way of example, an entire truss can be fabricated on-site by an automated beam builder 56. The builder 56 uses three feed spools 58 for feeding rolled raw material stock 57 to a processing unit 63 which folds or otherwise forms the stock into the longerons 1 of truss 5. The battens 2 and braces 3 for interconnecting the longerons are dispensed from three vertical brace dispensers 59 and three diagonal brace dispensers 60 respectively, dispensers 59 and 60 simultaneously spot welding battens 2 and braces 3 to the longerons 1 which they interconnect. Cut-off shears 61 are used to cut longerons 1 in accordance with the desired length of a given truss 5.

The use of an automated beam builder for fabricating basic structural trusses on-site can also be extended to include the function of attaching the fittings which comprise the connecting joints used for interconnection of the triangular trusses in the various interconnecting modes. By doing so the previously noted cost benefits associated with automated manufacturing can be extended even further.

Triangular truss 5 can also be built to varying truss depths and lengths to suit the needs of particular design applications. Although the following descriptions refer only to trusses of the type shown in FIG. 1, the construction techniques discussed are generally also applicable to trusses of the type shown in FIG. 2, except where specific differences are noted.

FIGS. 6a through 6h illustrate the various cross type arrangements for interconnecting two modular triangular trusses. The various cross type arrangements are effected through the use of one or more connecting joints, and in two of the arrangements one or more quadrapod structures.

Figure 4A:
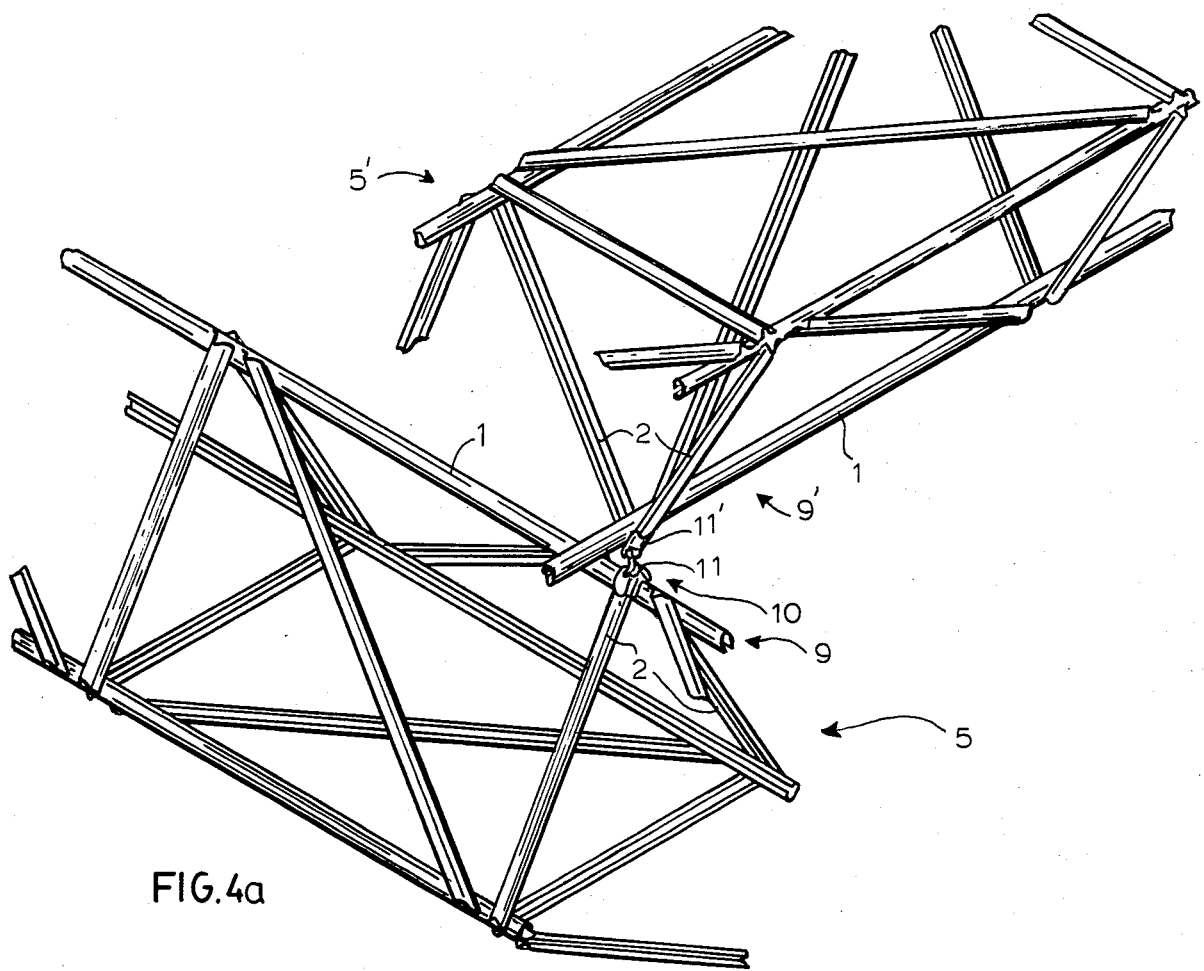
FIG. 4a is a perspective view of the apex-to-apex cross arrangement.
Figure 4B:
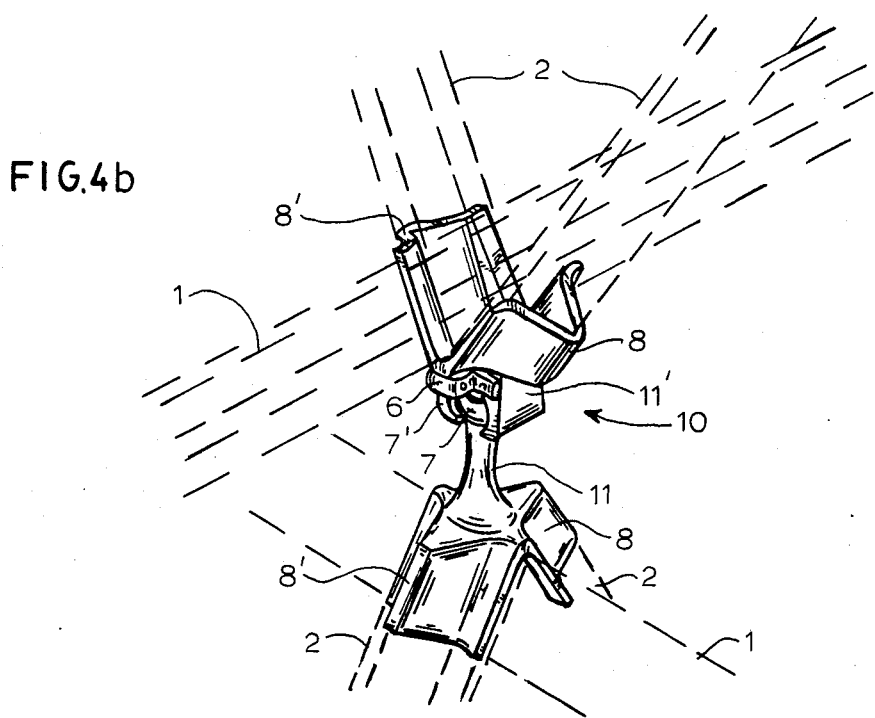
FIG. 4b is a perspective detail view on enlarged scale showing a typical connecting joint.

An illustrative connecting joint used for such cross arrangements is shown in perspective in FIGS. 4a and 4b. The connecting joint 10 shown therein is used to effect the apex-to-apex cross arrangement of FIGS. 6a and 6b. As shown in detail in FIG. 4b the joint is formed by the connection of a mating pair of male/female fittings 11 and 11', respectively. The construction of such fittings conforms to one of several connection designs. Typically, they may be of the shear-pin type, the snap-lock type, the probe and drogue type, or other mechanically or electrically actuated type which allows their quick connection. The embodiment of FIGS. 4a and 4b illustrates the use of a ball 7 for the construction of male fitting 11 and a partial socket 7' for the construction of female fitting 11'. As fittings 11 and 11' are brought together during assembly of a structure ball 7 is snapped into socket 7' and locked in position by a spring loaded catch 6 to hold trusses 5 and 5' together. The latch can also be designed to release the fitting to enable disassembly of said structure.

Also, as shown in detail in FIG. 4b, each of fittings 11 and 11' has two tabs 8 and 8' which are shaped to allow them to straddle a longeron, and two battens 2 forming part of an apex or base of a truss to allow the bonding of such tabs to such battens and longeron for the purpose of attaching fittings 11 and 11' to their respective trusses 5 and 5'.

The bonding of tabs 8 and 8' can be effected by an adhesive, mechanical fastening, or by welding, depending upon the material from which such fittings are manufactured. For a land environment such fittings would often be metal, and tabs 8 and 8' could be welded to the longeron and battens which they straddle. In contrast, for a space environment such fittings would in many applications be made from molded plastic, such that tabs 8 and 8' could be bonded to the longeron and battens they staddle by means of an adhesive.

Figure 6A:
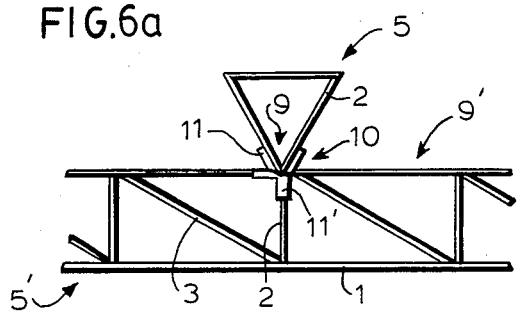
FIGS. 6a and 6b are diagrammatic front and side elevation views respectively of two triangular trusses interconnected by a connecting joint in an apex-to-apex cross arrangement.
Figure 6B:
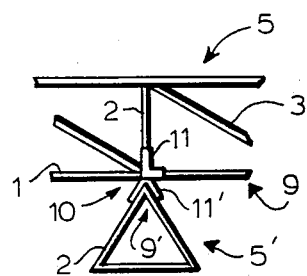

As noted previously, the apex-to-apex cross arrangement shown in FIGS. 6a and 6b is effected by means of a single connecting joint 10 interconnecting the apices 9 and 9' of triangular trusses 5 and 5'. Each apex 9 and 9' is formed by the intersection of a single longeron 1 and the series of battens 2 interconnecting the longeron with the other two longerons of the truss. Referring to FIGS. 6a and 6b, apex 9 of truss 5 is joined to apex 9' of truss 5' through single modular interconnecting member connecting joint 10. Connecting joint 10 is formed by the connection of mating fittings 11 and 11', which, in turn, straddle the respective longeron 1 and the two battens 2 forming that part of each of the respective apices 9 and 9' where trusses 5 and 5' are to be interconnected.

Figure 6C:
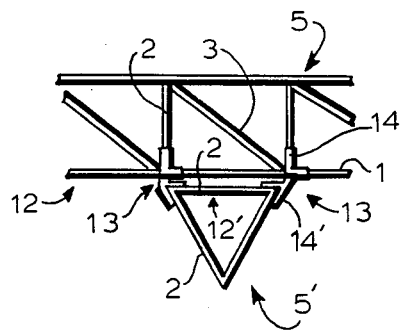
FIGS. 6c and 6d are diagrammatic front and side elevation views respectively of two triangular trusses interconnected by a plurality of connecting joints in a base-to-base cross arrangement.
Figure 6D:
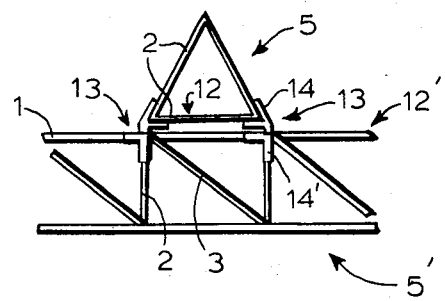

FIGS. 6c and 6d illustrate the base-to-base cross arrangement for interconnecting two triangular trusses. Each of the truss bases 12 and 12' is formed from two parallel and co-planar longerons 1 and their corresponding interconnecting battens 2. Base 12 of truss 5 is joined to base 12' of truss 5' through a plurality of interconnecting members comprising four identical connecting joints 13, such that the bases are lying in different but parallel planes. The construction and mounting of connecting joints 13 is similar to that of connecting joint 10 shown in FIGS. 6a and 6b, each consisting of mating fittings 14 and 14' mounted to trusses 5 and 5' respectively in a manner identical to that used to mount fittings 11 and 11' of FIGS. 4a, 4b, 6a and 6b.

Figure 6E:
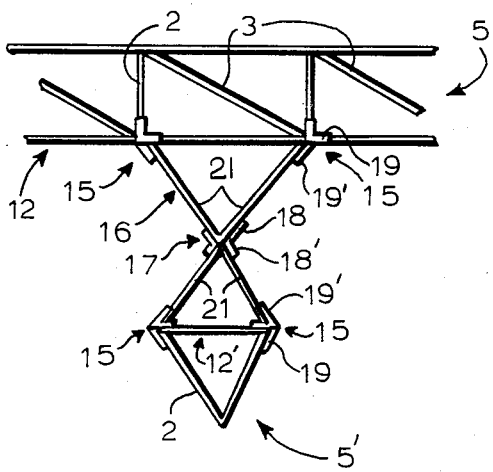
FIGS. 6e and 6f are diagrammatic front and side elevation views respectively of two triangular trusses interconnected by a plurality of connecting joints and two quadrapod structures in a base-to-base cross arrangement with increased spacing between the two trusses.
Figure 6F:
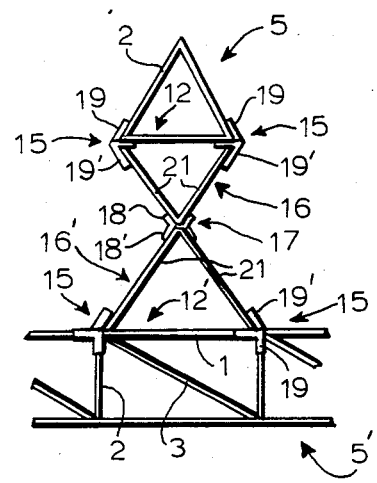

A variation of the base-to-base joining arrangement of FIGS. 6c and 6d is shown in FIGS. 6e and 6f. In this arrangement spacing between trusses 5 and 5', larger than the width of a truss base, is used. In accordance with this arrangement base 12 of truss 5 is interconnected to base 12' of truss 5' through a plurality of interconnecting members comprising eight identical connecting joints 15 and two identical quadrapod structures 16 and 16' interconnected by single connecting joint 17.

Both quadrapod structures 16 and 16' are pyramid-shaped pentahedral structures having fours legs 21, each joined at one end to a common juncture forming the apex of the pyramid, and at the other end to a fitting 19', which when joined with its mating fitting 19 forms one of the eight connecting joints 15. The apices of quadrapod structures 16 and 16' are connected to fittings 18 and 18' respectively, which, in turn, are joined together to form central connecting joint 17, causing quadrapod structures 16 and 16' to be interconnected in opposed relation to one another. The mounting of fittings 19 and 19' to trusses 5 and 5' is identical to the mounting of fittings 11 and 11' of the apex-to-apex arrangement of FIGS. 6a and 6b.

Figure 5A:
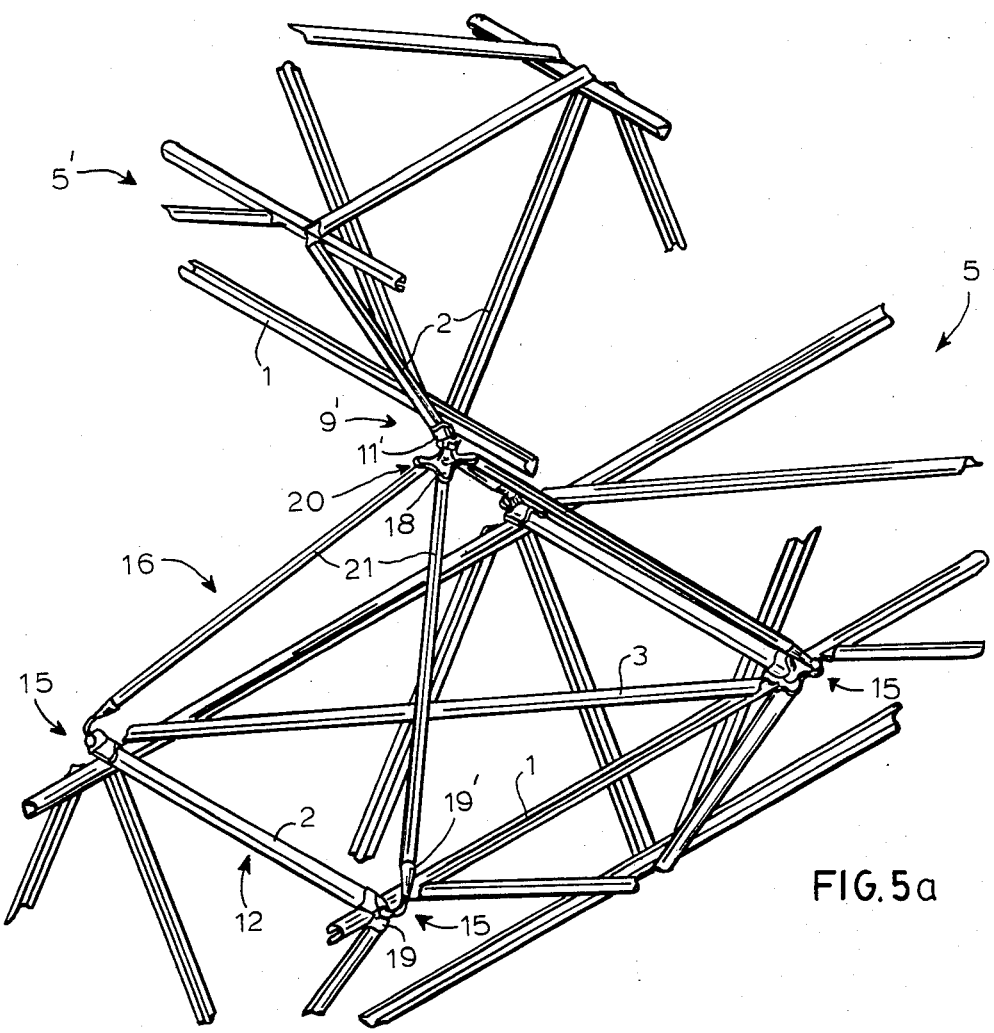
FIG. 5a is a perspective view of the base-to-apex cross arrangement showing a typical quadrapod structure.
Figure 5B:
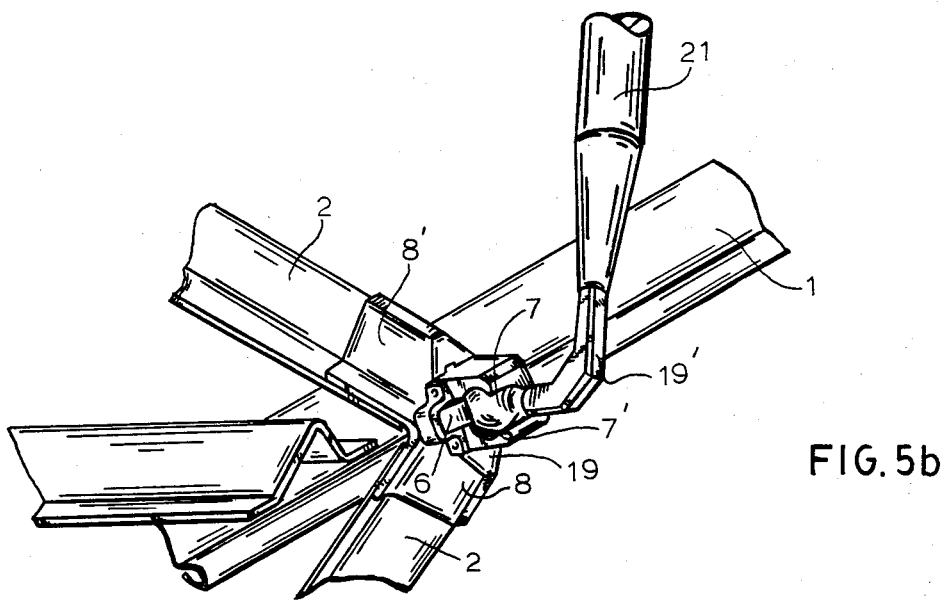
FIG. 5b is a perspective view of a typical connecting joint used in the base-to-apex cross arrangement.

FIGS. 5a, 6g and 6h illustrate the base-to-apex cross arrangement. As shown in FIGS. 5a, 6g and 6h, base 12 of truss 5 is joined to vertex 9' of truss 5' through a plurality of interconnecting members comprising four identical connecting joints 15, shown in greater detail in FIG. 5b, and a single connecting joint 20, all interconnected by quadrapod structure 16. Construction and mounting of connecting joints 15 is, again, similiar to that of the connecting joints in the aforementioned arrangements.

Quadrapod structure 16 of FIGS. 5a, 6g and 6h is identical to quadrapod structures 16 and 16' of FIGS. 6e and 6f. In the base-to-apex cross arrangement, the apex of quadrapod structure 16 is connected to fitting 18 which, in turn, is mated with fitting 11' to form connecting joint 20. Fitting 11' in this arrangement is identical to fitting 11' of the apex-to-apex arrangement of FIGS. 6a and 6b, and fitting 18 is identical to fitting 18 shown in FIGS. 6e and 6f. Again, the construction and mounting of the above fittings is similar to that used in the previous arrangements.

FIG. 5a is another view of the base-to-apex cross arrangement of FIGS. 6g and 6h, showing a typical quadrapod structure 16 in perspective. As noted previously, the quadrapod structure 16 shown is similar to quadrapod structures 16 and 16' used in the base-to-base cross arrangement shown in FIGS. 6e and 6f. For a land environment legs 21 of quadrapod structures 16 and 16' can be fabricated from the same materials from which the structural elements of the triangular trusses are formed. However, for a space environment the preferred embodiment would be moulded plastic for moulding an entire quadrapod structure in one piece. Such moulding could also include fittings 18, 18' and 19' as an integral part thereof. If alternative materials such as thin gauge aluminum or composites are used to make legs 21, fittings 18, 18' and 19' would be bonded to legs 21 by means of an adhesive, spot welding, or the like.

FIGS. 7 and 8 illustrate two alternatives of the construction technique for constructing Tribeams from triangular trusses. Functionally, the Tribeam is a larger version of the triangular truss. Here the interconnection of the modular trusses are effected through the use of a plurality of connecting joints and vertical and diagonal structural members.

The connecting joints used to interconnect the triangular trusses 5 and structural members 28, 29 and 31 into the tribeams and platforms of FIGS. 7, 8 and 9 are more complex in design than those connecting joints used in the various cross arrangements of FIGS. 6a through 6h. Each of these connecting joints consists of a multi-fitting piece of female construction mated to a plurality of individual male fittings attached to the various structural members. Thus, for each of the individual male fittings being used there is a corresponding female fitting moulded into the multi-fitting piece.

Figure 9C:
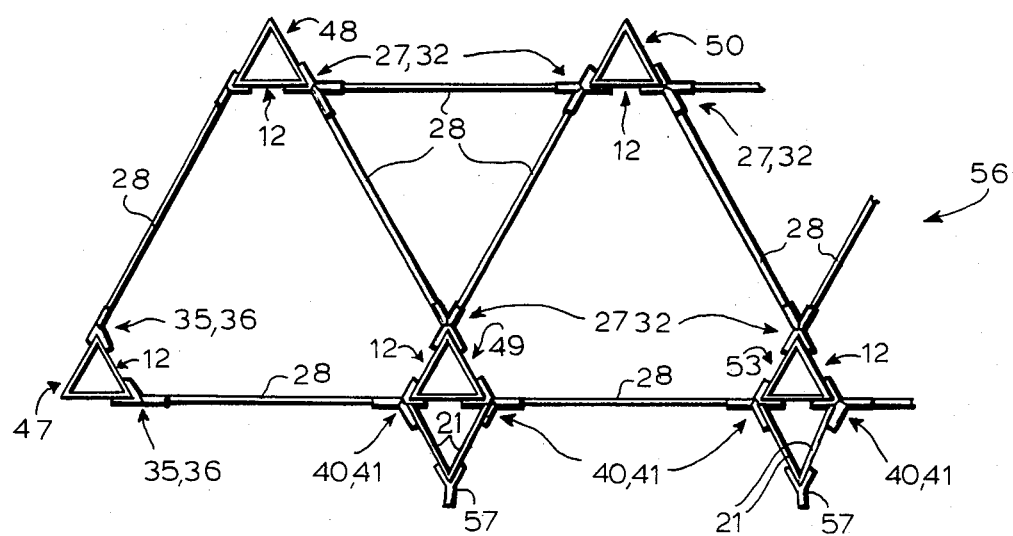
FIG. 9c is a diagrammatic front elevation view of a large structural platform using an upright-apex design (similar to FIG. 8a) in which the modular sub-assemblies are interconnected by a plurality of connecting joints and structural members.
Figure 9B:
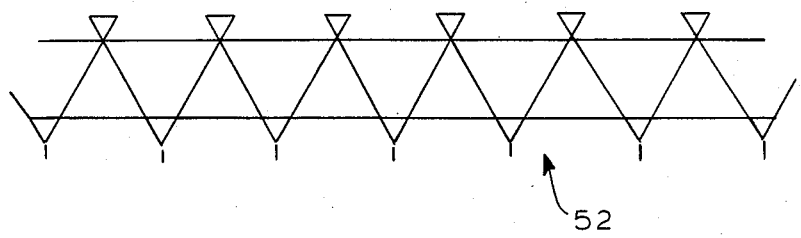
FIG. 9b is an extended drawing of the platform shown in FIG. 9a, but with less detail.
Figure 9D:
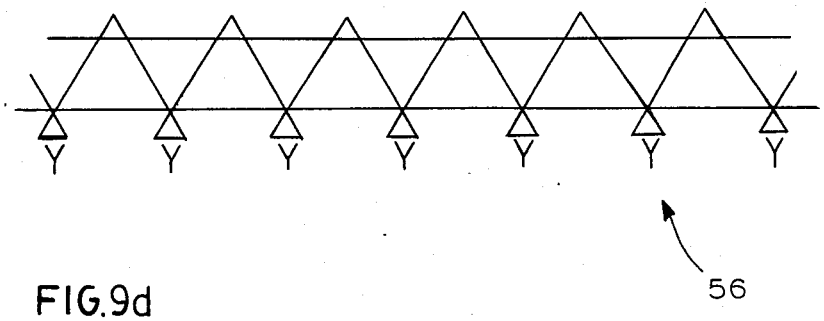
FIG. 9d is an extended drawing of the platform shown in FIG. 9c, but with less detail.
Figure 10B:
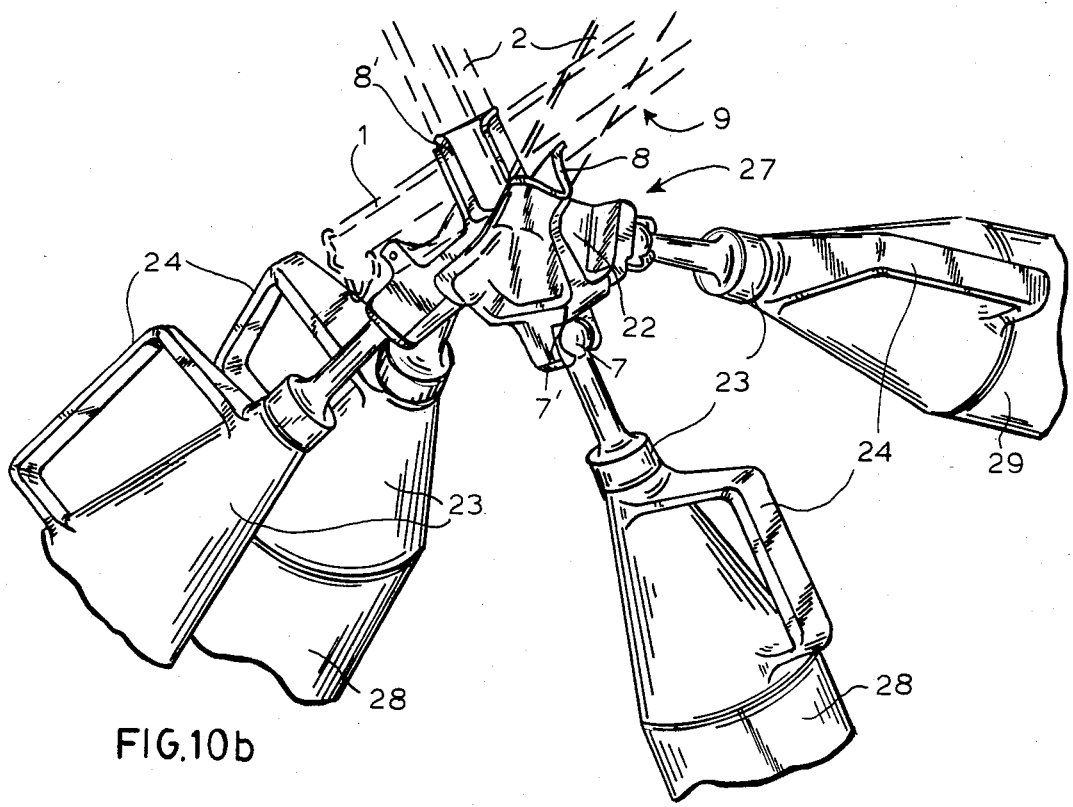
Figure 10A:
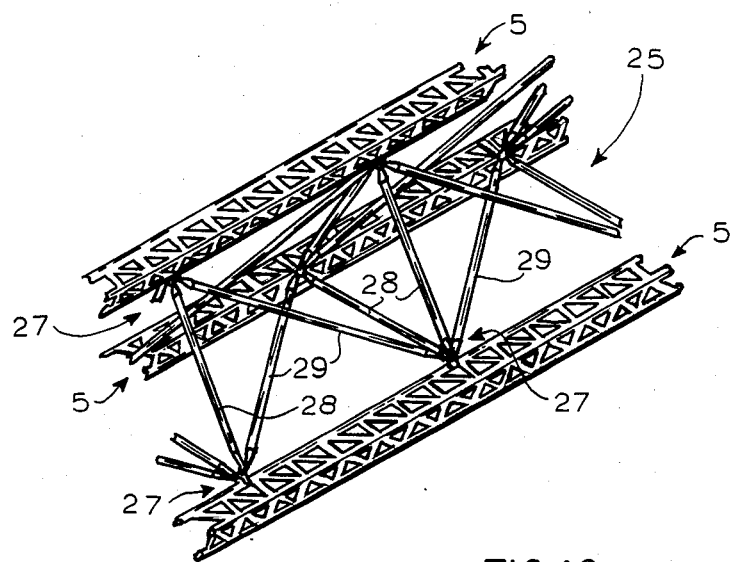
FIG. 10a is a perspective view of the Inverted-Apex Tribeam shown in FIGS. 7a and 7b.

For example, connecting joint 27 shown in FIGS. 10a and 10b, perspective views of the Inverted-Apex Tribeam of FIGS. 7a and 7b, is representative of the complex joints used in the tribeams and platforms of FIGS. 7, 8 and 9. As shown in detail in FIG. 10b, connecting joint 27 consists of multi-fitting piece 22, attached to vertex 9 of truss 5, and mated with individual fittings 23, which are attached to battens 28 and to braces 29. In the preferred embodiment for space multi-fitting piece 22 consists of a moulded piece of plastic incorporating a plurality of fittings of female construction. It is attached like fittings 11 and 11' of FIGS. 4a and 4b to one of the longerons 1 and two of the battens 2 comprising vertex 9 of truss 5, shown in phantom to better illustrate connecting joint 27. Individual fittings 23 would also be made of moulded plastic, but of the oppposite sex to the fittings moulded into multi-fitting piece 22. As shown in FIG. 10b, fittings 23 also have a handle 24 moulded into them to aid a land based worker or an astronaut working in orbit to assemble connecting joint 27 more easily. Such a handle would be moulded into like fittings used in multi-fitting connecting joints similar to connecting joint 27.

Figure 7D:
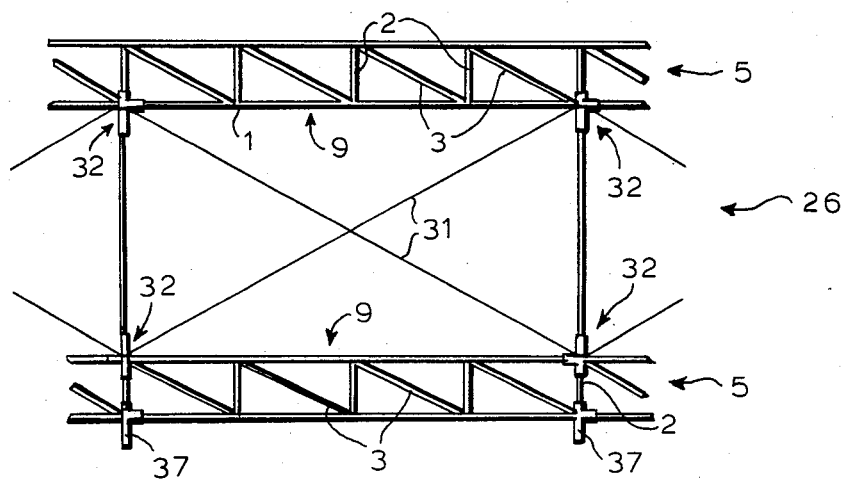

FIGS. 7a through 7d illustrate the interconnection of triangular trusses in Inverted-Apex Tribeam configurations. As shown in FIG. 7a, Tribeam 25 consists of three interconnected triangular trusses 5 longitudinally parallel to and equidistant from each other. Referring to FIGS. 7a and 7b, each triangular truss 5 of Tribeam 25 is interconnected along one apex 9 to each of the other two trusses 5 through interconnecting members comprising connecting joints 27, vertical structural members (battens) 28 lying in a series of planes normal to the longitudinal axis of the Tribeam 25, and diagonal structural members or braces 29 lying diagonally between adjacent battens 28. The battens 28 and braces 29 are positioned so as to extend between the connecting joints 27 and are constructed from either plastic, aluminum or composite materials, depending upon the environment and application in which the structure is used. The planes in which the battens 28 and braces 29 lie simultaneously define a space 30 having a triangular cross-section, the vertices of which correspond to the locations of connecting joints 27.

FIGS. 7c and 7d illustrate Inverted-Apex Tribeam 26, identical in construction to Tribeam 25, except that it is constructed with diagonal structural members consisting of pairs of pre-tensioned metal cables 31 for diagonal bracing, each cable pair 31 being substituted for a single brace 29. Connecting joint 32 is a modified version of joint 27, which is adapted to interconnect the three triangular trusses 5 through battens 28 and diagonal bracing cables 31.

FIGS. 8a through 8d illustrate the construction technique for the interconnection of triangular trusses into Upright-Apex Tribeams 33 and 34. Construction of these Tribeams is similar to that of the Inverted-Apex Tribeams 25 and 26 except that the bases of the three triangular trusses, rather than their apices, are interconnected. As a result of this joining arrangement Upright-Apex Tribeams 33 and 34 require twice as many connecting joints over a given length as do Inverted-Apex Tribeams 25 and 26 of FIGS. 7a through 7d.

Figure 8A:
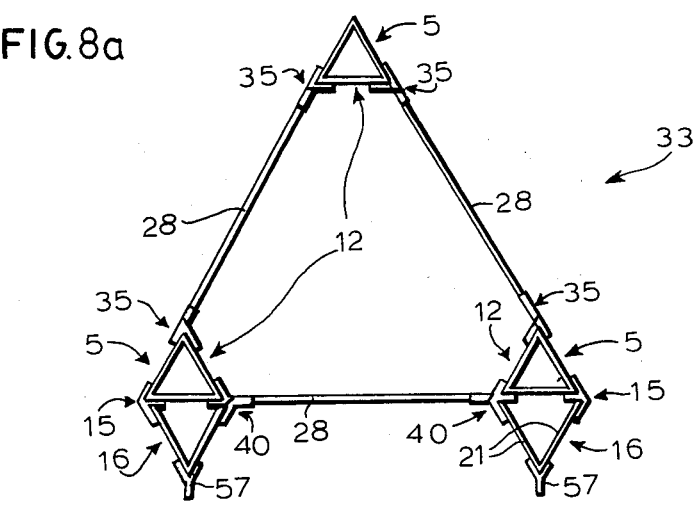
FIGS. 8a and 8b are diagrammatic front and side elevation views respectively of an Upright-Apex Tribeam in which the modular sub-assemblies are interconnected by a plurality of connecting joints and structural members, the diagonal structural members used for diagonal bracing comprising structural braces.
Figure 8B:
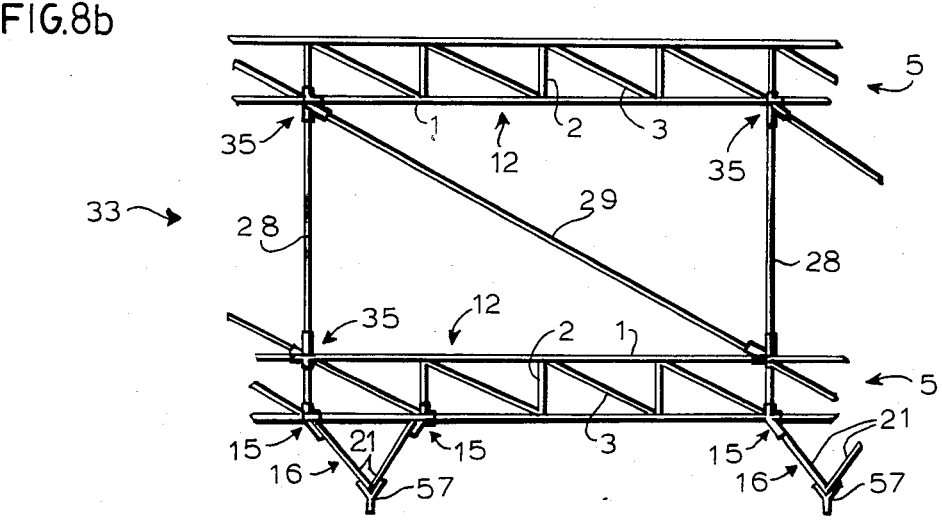

Referring to FIGS. 8a and 8b, each of the three triangular trusses 5 are interconnected along one base 12 to each of the other two trusses 5 through interconnecting members comprising connecting joints 35, vertical structural members, or battens 28 identical to those shown in FIGS. 7a–7d, and lying in a series of planes normal to the longitudinal axis of Tribeam 33, and diagonal structural members, or braces 29, also identical to those shown in FIGS. 7a and 7b, and lying diagonally between adjacent battens 28. Again, the battens 28 and braces 29 are positioned so as to extend between the connecting joints 35.

As shown in FIGS. 8c and 8d, Upright-Apex Tribeam 34 is similar in construction to Tribeam 33 of FIGS. 8a and 8b, except that it is constructed with pairs of pre-tensioned cables 31, substituted for braces 29, necessitating the use of connecting joint 36. Connecting joint 36 is a modified version of connecting joint 35, being adapted to accommodate cables 31.

FIGS. 7 and 8 also illustrate the construction technique for mounting equipment, sensors or other like structures to either triangular trusses alone, or when used within a Tribeam, or for combinations of both evolved into various large structures.

For the Inverted-Apex Tribeams 25 and 26, FIGS. 7a-7d show a plurality of mounting adapter fittings 37, each attached to an apex 9 of a truss 5. Each mounting adapter fitting 37 is used to attach any equipment, sensors or other like structures which may be used with a given structure. Like fittings 11 and 11' of the apex-to-apex arrangement of FIGS. 4a and 4b, fitting 37 is mounted on the longeron 1 and two of the battens 2 comprising part of vertex 9.

FIGS. 8a through 8d show the construction technique for mounting equipment or sensors or other like structures to Upright-Apex Tribeams 33 and 34. Referring to FIGS. 8a and 8b by way of example only, each mounting adapter fitting 57 is connected to a base 12 of a truss 5 of Tribeam 33 through a quadrapod structure 16, which is identical to quadrapod structure 16 of FIGS. 4e through 4h and 5a. The apex of quadrapod structure 16 is attached to fitting 57 which is used to attach equipment, sensors or other like structures. Each of three of the legs 21 of quadrapod structure 16 are attached on the ends opposite fitting 57 to truss 5 through a connecting joint 15, which is identical to the connecting joint 15 used with two variations of the cross arrangement. The remaining leg 21 is attached to truss 5 through a second type of connecting joint 40 which is a modification of connecting joint 35.

For an Upright-Apex Tribeam using pre-tensioned cables 31 for diagonal bracing, as in FIGS. 8c and 8d, connecting joint 41 is used, it being a variation of connecting joint 36, modified to accommodate cables 31 and remaining leg 21.

FIGS. 9a through 9d illustrate the construction technique for constructing a multiplicity of triangular trusses into large structural platforms. The basic designs and structural components of the Tribeams of FIGS. 7 and 8 are used, but extended according to the requirements of the particular structural design being implemented.

FIG. 9a illustrates platform 52 incorporating the design of the Inverted-Apex Tribeam of FIGS. 7a through 7d. Basic connecting joint 27, used with brace 29 shown in FIGS. 7a-7d, are supplemented by additional connecting joints 42 and 43. Connecting joint 32, used with cable pairs 31 shown in FIGS. 7a-7d, are supplemented by additional connecting joints 44 and 45.

Referring to FIG. 9a, connecting joints 42 or 44 are used to interconnect truss 48 of first tribeam arrangement 46 to trusses 47 and 49 of first tribeam arrangement 46 and truss 50 of second tribeam arrangement 51, which also encompasses truss 49. The remaining two joints of first tribeam arrangement 46, used to interconnect trusses 47, 48 and 49, are both a connecting joint 27 for use with brace 29 shown in FIGS. 7b and 8b, and connecting joint 32 for use with cables 31, shown in FIGS. 7d and 8d.

For the remaining tribeam arrangements of platform 52, except the last, joints 43 and 45 are used to interconnect the three trusses within a tribeam arrangement and two other trusses, each of which is part of an adjoining tribeam arrangement. Thus, for example, as shown FIG. 9c, joints 43 or 45 interconnect trusses 48, 49, 50, 53 and 54; trusses 49, 50 and 53 being part of tribeam arrangement 51, and trusses 48 and 54 being part of tribeam arrangements 46 and 55, both adjoining arrangement 51. Joint 43 is used with brace 29 shown in FIGS. 7b and 8b, while joint 45 is used with cables 31, shown in FIGS. 7d and 8d.

FIG. 9d is an overview of the structural configuration of platform structure 52 which generally used the design of the Inverted-Apex Tribeam. As the drawing indicates the platform may be extended to any required size.

FIG. 9c illustrates platform 56 incorporating the design of the Upright-Apex Tribeams of FIGS. 8a through 8d. Where brace 29, shown in FIG. 8b, is used, two connecting joints 35 are used to interconnect the bases 12 of end trusses such as 47 and 48, and lower level trusses such as 47 and 49. Connecting joint 27 used with the Inverted-Apex Tribeam of FIGS. 7a and 7b is used to interconnect the upper level trusses such as 48 and 50 with each other and with lower level trusses such as 49 and 53. Where cabling 31 is used, Tribeam connecting joints 32 and 36 are substituted for connecting joints 27 and 35 respectively.

FIG. 9d is an overview of the structural configuration of platform structure 56 which generally uses the design of an Upright-Apex Tribeam. As with platform structure 52, platform structure 56 may also be extended as required.

Connecting joints 32, 35, 36, 40, 41, 42, 43, 44 and 45 shown in FIGS. 7, 8 and 9 would all be of similar construction to connecting joint 27 shown in FIGS. 7a, 7b, 10 and 10b, varying only in the shape and the number of individual fittings used.

In a practical embodiment of the invention, an automated beam builder as shown in FIG. 3 would be transported to the particular land construction site, or placed in orbit by means of the space shuttle, for instance. The construction crew or the crew of the space shuttle or orbital construction site would then operate the automated beam builder to fabricate the requisite number of triangular trusses with the necessary fittings for assembling a specific design of a large space structure attached to them. The required joining members could be transported or also automatically fabricated with connecting joints at the construction site, whether on the ground or in orbit. In accordance with the specific design selected each triangular truss is moved to its proper location where it is readily attached to other triangular trusses through the joining members in a rapid but orderly fashion to complete the structure.

The construction of any structure is readily facilitated using the described methods of modular constructon because of the modular structural components and because of the ease with which they are joined together. Thus, the present invention provides a simpler less expensive and more efficient means of constructing large structures, requiring less labor and construction equipment for final assembly at the construction site.

The terms and expressions which have been employed are used in a descriptive and not a limiting sense, with no intention of excluding equivalents of the invention described and claimed.

What is claimed is:

1. A truss assembly for facilitating the construction of large space structures comprising:
 (a) at least two modular sub-assemblies assembled in at least one of a limited plurality of standardized cross and platform interconnecting arrangements, each of said modular sub-assemblies being comprised of at least one triangular truss comprised of a plurality of longerons and a plurality of battens interconnecting said longerons, and
 (b) at least one modular interconnecting member interconnecting said triangular trusses in said standardized interconnecting arrangements, said at least one modular interconnecting member being disposed between said triangular trusses and being comprised of at least one connecting joint comprised of a plurality of separate, but readily mated fittings, at least one of said fittings further comprising a plurality of tabs straddling at least one of said longerons and a plurality of said battens of at least one of said triangular trusses for attachment to said at least one triangular truss.

2. A truss assembly as recited in claim 1 wherein each of said triangular trusses is a pentahedral truss structure comprising:
   (a) three of said longerons, said longerons being parallel and arranged in the form of a continuous longitudinal structure with a triangular cross section;
   (b) a plurality of said battens interconnecting said longerons, said battens lying in a series of planes normal to the longitudinal axis of said triangular truss, each of said battens being connected at one end to a first of said longerons and at the other end to a second of said longerons; and
   (c) a plurality of diagonal bracing structural members lying diagonally between adjacent ones of said battens, each of said diagonal bracing structural members being connected at one end to a first of said longerons and at the other end to a second of said longerons.

3. A truss assembly as recited in claim 1 wherein said at least one standardized interconnecting arrangement is a cross arrangement comprising:
   (a) a first modular sub-assembly, and
   (b) a second modular sub-assembly orthogonally overlapping and interconnected to said first modular sub-assembly, each of said first and second modular sub-assemblies being either a triangular truss or a Tribeam.

4. A truss assembly as recited in claim 3 wherein said cross arrangement comprises a first apex of said first modular sub-assembly interconnected to a second apex of said second modular sub-assembly and wherein said at least one modular interconnecting member is comprised of a single connecting joint comprising a first fitting attached to said first apex, and a second fitting attached to said second apex, said first and second fittings being mated together to form said single connecting joint.

5. A truss assembly as recited in claim 3 wherein said cross arrangement comprises a first base of said first modular subassembly interconnected to a second base of said second modular sub-assembly and wherein said first and second sub-assemblies are interconnected by a plurality of modular interconnecting members comprising four connecting joints, each connecting joint having a first fitting attached to said first base of said first modular sub-assembly and a second fitting attached to said second base of said second modular sub-assembly, said first and second fittings being mated together so as to form said connecting joints.

6. A truss assembly as recited in claim 3 wherein said cross arrangement comprises a first base of said first modular sub-assembly interconnected to a second base of said second modular sub-assembly and wherein said first and second modular sub-assemblies are interconnected by a plurality of modular interconnecting members comprising:
   (a) a first quadrapod structure comprised of four first legs joined together at one end to form a first juncture, and extending outwardly from said first juncture so as to form a first pyramid type structure,
   (b) a second quadrapod structure comprised of four second legs joined together at one end to form a second juncture, and extending outwardly from said second juncture so as to form a second pyramid type structure,
   (c) a first connecting joint comprised of a first fitting attached to said first juncture, and of a second fitting attached to said second juncture, said first and second fittings being mated together to form said first connecting joint, thereby causing said first quadrapod structure and said second quadrapod structure to be in opposed relation to each other, and
   (d) eight second connecting joints, each of said second connecting joints being comprised of a mated pair of fittings comprised of a third fitting attached to either of said first or second bases of said structural members, and a fourth fitting attached to one of said first or second legs comprising said first and second quadrapod structures.

7. A truss assembly as recited in claim 3 wherein said cross arrangement comprises a base of said first modular sub-assembly interconnected to an apex of said second modular sub-assembly, and wherein said first and second modular sub-assemblies are interconnected by a plurality of modular interconnecting members comprising:
   (a) a quadrapod structure comprised of four legs joined together at one end and extending outwardly from said juncture so as to form a pyramid type structure,
   (b) four first connecting joints, each comprised of a first pair of mated fittings having a first fitting attached to the base of said first truss beam, and a second fitting attached to one of said four legs of said quadrapod structure, and
   (c) a second connecting joint comprised of a second pair of mated fittings having a third fitting attached to the apex of said second truss beam, and a fourth fitting attached to the juncture of said four legs of said quadrapod structure.

8. A truss assembly as recited in claim 1 further comprising a mounting adaptor for mounting equipment, sensors or other structures comprising a fitting attached at one end to an apex of one of said triangular trusses and having a means for attaching said equipment, sensors or other structures at the other end.

9. A truss assembly as recited in claim 1 further comprising a mounting adaptor for mounting equipment, sensors or other structures comprising:
   (a) a quadrapod structure comprised of four legs joined together at one end to form a juncture, and extending from said juncture so as to form a pyramid type structure,
   (b) a first fitting attached at one end to said juncture, and having a means for attaching said equipment, sensors or other structures at the other end, and
   (c) four connecting joints, each comprised of a second fitting attached to a base of one of said triangular trusses and a third fitting attached to one of said four legs of said quadrapod structure, said second and third fittings being mated together to form said connecting joint.

10. A truss assembly as recited in claim 1 wherein said standardized interconnecting arrangements further comprise an Inverted-Apex Tribeam arrangement comprising three longitudinal and parallel triangular trusses disposed about a central axis so as to form a continuous structure having a generally triangular cross section, a single apex of each of said triangular trusses being interconnected to a single apex of each of said other two triangular trusses, and wherein said three triangular trusses are interconnected by a plurality of modular interconnecting members interconnecting, and being positioned between, said apices and lying in planes defining a pentahedron, said plurality of modular interconnecting members comprising:

(a) a plurality of vertical structural members lying in a plurality of planes normal to said central axis;

(b) a plurality of diagonal structural members lying diagonally between adjacent vertical structural members; and (c) a plurality of connecting joints joining said vertical and diagonal structural members to said apices of said triangular trusses, said connecting joints being disposed between said structural members and said apices, each of said connecting joints being comprised of a multi-fitting piece attached to one of said apices of one of said triangular trusses, and a plurality of individual fittings, each of said individual fittings being attached to an end of one of said vertical or diagonal structural members, said multi-fitting piece and said individual fittings being mated together to form said connecting joints, each of said individual fittings having handles for aiding in the assembly of said connecting joints.

11. A truss assembly as recited in claim 1 wherein said standardized interconnecting arrangements further comprise an Upright-Apex Tribeam arrangement comprising three longitudinal and parallel triangular trusses disposed about a central axis so as to form a continuous structure having a substantially triangular cross section, a single base of each of said triangular trusses being interconnected to a single base of each of said other two triangular trusses, and wherein said three triangular trusses are interconnected by a plurality of modular interconnecting members interconnecting, and being positioned between, said bases and lying in planes defining an octahedron, said plurality of modular interconnecting members comprising:

(a) a plurality of vertical structural members lying in a plurality of planes normal to the central axis;

(b) a plurality of diagonal structural members lying diagonally between adjacent vertical structural members; and (c) a plurality of connecting joints joining said vertical and diagonal structural members to said bases of said triangular trusses, said connecting joints being disposed between said structural members and said bases, each of said connecting joints being comprised of a multi-fitting piece attached to one of said bases of one of said triangular trusses, and a plurality of individual fittings, each of said individual fittings being attached to an end of one of said vertical or diagonal structural members, said multifitting piece and said individual fittings being mated together to form said connecting joints, each of said individual fittings having handles for aiding in the assembly of said connecting joints.

12. A truss assembly as recited in claim 1 wherein said at least one standardized interconnecting arrangement is a platform with an inverted-apex design comprising:

a plurality of longitudinal and parallel modular sub-assemblies positioned alternately between an upper plane and a lower plane so as to extend laterally in alternating series, said upper and lower planes being parallel, and, wherein at least said modular sub-assemblies are interconnected by a plurality of modular interconnecting members disposed between said modular sub-assemblies and interconnecting a single apex of each of the modular sub-assemblies positioned in the upper plane with a single base of one or more of the modular sub-assemblies positioned in the lower plane so as to form a plurality of parallel but overlapping inverted-apex tribeam arrangements extending laterally in series, said modular interconnecting members lying in planes defining a series of collateral alternating polyhedrons comprising pentahedrons and hexahedrons.

13. A truss assembly as recited in claim 1 wherein said at least one standardized interconnecting arrangement is a platform with an upright-apex design comprising a plurality of longitudinal and parallel modular sub-assemblies positioned alternately between an upper plane and a lower plane so as to extend laterally in alternating series, said upper and lower planes being parallel, and wherein at least said modular sub-assemblies are interconnected by a plurality of modular interconnecting members disposed between said modular sub-assemblies and interconnecting a single base of each of the modular sub-assemblies positioned in the upper plane with one or more bases of one or more of the modular sub-assemblies positioned in the lower plane so as to form a plurality of parallel but overlapping upright-apex tribeam arrangements extending laterally in series, said modular interconnecting members lying in planes defining a series of collateral alternating polyhedrons comprising octahedrons and pentahedrons.

14. A truss assembly as recited in claim 2 wherein said at least one modular interconnecting member is comprised of at least one connecting joint comprising a male fitting mated with a female fitting.

15. A truss assembly as recited in claim 14 wherein said modular sub-assemblies are further interconnected by a plurality of modular interconnecting members comprising at least one quadrapod structure comprised of four legs joined together at one end to form a juncture, and extending outwardly from said juncture so as to form a pyramid type pentahedral structure, and a plurality of said connecting joints, said at least one quadrapod structure being joined to said modular sub-assemblies by a plurality of said connecting joints.

16. A truss assembly as recited in claim 2 wherein said modular sub-assemblies are interconnected by a plurality of modular interconnecting members comprising:

(a) a plurality of connecting joints, each comprised of a multi-fitting female fitting attached to said triangular trusses and mated with a plurality of individual male fittings, said female fitting having said plurality of tabs, each tab straddling one of said longerons and one of said battens;

(b) a plurality of vertical structural members attached on each end to one of said individual male fittings; and (c) a plurality of diagonal structural members lying diagonally between adjacent vertical structural members and attached on each end to one of said individual male fittings.

17. A truss assembly according to claims 14 or 16 wherein said male fittings comprise a shaft having a ball tip, and said female fittings comprise a partial ball socket having a catch for locking said ball tip in said ball socket.

18. A truss assembly as recited in claim 12, wherein said plurality of modular interconnecting members comprises:
 (a) a plurality of vertical structural members lying in a plurality of planes normal to said central axis;
 (b) a plurality of diagonal structural members lying diagonally between adjacent vertical structural members; and
 (c) a plurality of connecting joints joining said vertical and diagonal structural members to said apices of said triangular trusses, said connecting joints being disposed between said structural members and said apices.

19. A truss assembly as recited in claim 18 wherein each of said connecting joints is comprised of a multi-fitting piece attached to one of said apices of one of said triangular trusses, and a plurality of individual fittings, each of said individual fittings being attached to an end of one of said vertical or diagonal structural members, said multi-fitting piece and said individual fittings being mated together to form said connecting joints.

20. A truss assembly as recited in claim 13 wherein said plurality of modular interconnecting members comprises:
 (a) a plurality of vertical structural members lying in a plurality of planes normal to the central axis;
 (b) a plurality of diagonal structural members lying diagonally between adjacent vertical structural members; and
 (c) a plurality of connecting joints joining said vertical and diagonal structural members to said bases of said triangular trusses, said connecting joints between disposed between said structural members and said bases.

21. A truss assembly as recited in claim 20 wherein each of said connecting joints is comprised of a multi-fitting piece attached to one of said bases of one of said triangular trusses, and a plurality of individual fittings, each of said individual fittings being attached to an end of one of said vertical or diagonal structural members, said multi-fitting piece and said individual fittings being mated together to form said connecting joints.

22. A base-to-base cross arrangement truss structure comprising:
 (a) a first triangular truss,
 (b) a second triangular truss orthogonally overlapping said first triangular truss, and
 (c) a plurality of modular interconnecting members interconnecting a first base of said first triangular truss to a second base of said second triangular truss, the plurality of modular interconnecting members comprising:
  (1) a first quadrapod structure comprising four first legs joined together at one end to form a first juncture, and extending outwardly from said first juncture so as to form a first pyramid type structure,
  (2) a second quadrapod structure comprising four second legs joined together at one end to form a second juncture, and extending outwardly from said second juncture so as to form a second pyramid type structure,
  (3) a first connecting joint comprising a first fitting attached to said first juncture, and of a second fitting attached to said second juncture, said first and second fittings being mated together to form said first joint thereby causing said first quadrapod structure and said second quadrapod structure to be in opposed relation to each other, and
  (4) eight second connecting joints, each connecting joint comprising a mated pair of fittings comprising a third fitting attached to either of said first or second bases of said structural members, and a second fitting attached to one of said first or second legs comprising said first and second quadrapod structures.

23. A base-to-apex cross arrangement truss structure comprising:
 (a) a first triangular truss,
 (b) a second triangular truss, and
 (c) a plurality of modular interconnecting members interconnecting a base of said first triangular truss to an apex of said second triangular truss, the plurality of modular interconnecting members comprising:
  (1) a quadrapod structure comprising four legs joined together at one end to form a juncture and extending outwardly from said juncture so as to form a pyramid type structure,
  (2) four first connecting joints, each comprising a first pair of mated fittings having a first fitting attached to the base of said first triangular truss, and a second fitting attached to one of said four legs of said quadrapod structure, and
  (3) a second connecting joint comprising a second pair of mated fittings having a third fitting attached to the apex of said second triangular truss, and a fourth fitting attached to the juncture of said four legs of said quadrapod structure.

24. Modular interconnecting members for interconnecting at least two triangular trusses in cross arrangements comprising one or more connecting joints comprising a male fitting mated with a female fitting, each of said fittings having a plurality of tabs, each tab straddling a longeron and a batten of said triangular trusses and conforming in shape to the shape of said batten.

25. Modular interconnecting members according to claim 24 further comprising one or more quadrapod structures comprising four legs joined together at one end to form a juncture, and extending outwardly from said juncture so as to form a pyramid type pentahedral structure, said quadrapod structures being joined to said triangular trusses by a plurality of said connecting joints.

26. Modular interconnecting members for interconnecting at least two triangular trusses in tribeam or platform arrangements comprising:
 (a) a plurality of connecting joints each comprising a multi-fitting female fitting mated with a plurality of individual male fittings, said female fitting having a plurality of tabs, each tab straddling a longeron and a batten of said triangular trusses and conforming in shape to the shape of said batten;
 (b) a plurality of vertical structural members attached on each end to one of said individual male fittings; and
 (c) a plurality of diagonal structural members lying diagonally between adjacent vertical structural members and attached on each end to one of said individual male fittings.

27. Modular interconnecting members according to claims 24 or 26 wherein said male fittings comprise a shaft having a ball tip, and said female fittings comprise a partial ball socket having a catch for locking said ball tip in said ball socket.

28. A truss assembly as recited in claims 10 or 11 wherein said Tribeam is comprised from three longitudinal and parallel tribeams.

29. A truss structure as recited in claims 4, 5, 6, 22, 7, 23, 8, 9, 14, 16, 24, 26, 18, 19, 20 or 21 wherein the connecting joints and fittings are constructed from moulded plastic.

30. A truss structure as recited in claims 6, 22, 7, 23, 9, 15 or 25 wherein the quadrapod structure is constructed from moulded plastic.

31. A truss structure as recited in claims 16, 26, 19 or 21 wherein the individual fittings have handles for aiding the assembly of said connecting joints.

32. A truss structure as recited in claim 17 wherein the connecting joints and fittings are constructed from moulded plastic.

33. A truss structure as recited in claim 27 wherein the connecting joints and fittings are constructed from moulded plastic.

* * * * *

UNITED STATES PATENT AND TRADEMARK OFFICE
CERTIFICATE OF CORRECTION

PATENT NO. : 4,543,761
DATED : October 1, 1985
INVENTOR(S) : JOHN MOCKOVCIAK, JR.

It is certified that error appears in the above-identified patent and that said Letters Patent is hereby corrected as shown below:

Col. 4, line 44, change "7B" to --7b--

Col. 9, line 62, change "9c" to --9a--

Col. 10, line 2, change "used" to --uses--

Col. 15, line 35, change "between" (first occurrence) to -- being --

Col. 17, line 10, change "24, 26," to -- 17, 24, 26, 27 --

Signed and Sealed this

Twentieth Day of January, 1987

Attest:

DONALD J. QUIGG

Attesting Officer

Commissioner of Patents and Trademarks